United States Patent
Shibata

(10) Patent No.: US 11,077,710 B2
(45) Date of Patent: *Aug. 3, 2021

(54) LAMINATE OF THERMOPLASTIC RESIN FILM AND RUBBER, INNER LINER MATERIAL, AND PNEUMATIC TIRE

(71) Applicant: The Yokohama Rubber Co., Ltd., Tokyo (JP)

(72) Inventor: Hirokazu Shibata, Hiratsuka (JP)

(73) Assignee: The Yokohama Rubber Co., Ltd., Tokyo (JP)

( * ) Notice: Subject to any disclaimer, the term of this patent is extended or adjusted under 35 U.S.C. 154(b) by 613 days.

This patent is subject to a terminal disclaimer.

(21) Appl. No.: 15/745,532

(22) PCT Filed: Jul. 14, 2016

(86) PCT No.: PCT/JP2016/070888
§ 371 (c)(1),
(2) Date: Apr. 19, 2018

(87) PCT Pub. No.: WO2017/014158
PCT Pub. Date: Jan. 26, 2017

(65) Prior Publication Data
US 2018/0281519 A1    Oct. 4, 2018

(30) Foreign Application Priority Data

Jul. 17, 2015    (JP) ............................. JP2015-143309

(51) Int. Cl.
| | | |
|---|---|---|
| *B60C 1/00* | (2006.01) | |
| *C08K 5/06* | (2006.01) | |
| *C08L 23/28* | (2006.01) | |
| *C08K 3/06* | (2006.01) | |
| *C08K 5/34* | (2006.01) | |
| *C08L 61/06* | (2006.01) | |
| *C08L 21/00* | (2006.01) | |
| *B32B 25/08* | (2006.01) | |
| *B60C 5/14* | (2006.01) | |
| *C08K 5/3492* | (2006.01) | |
| *C08K 5/17* | (2006.01) | |
| *C08L 29/04* | (2006.01) | |
| *C08G 69/08* | (2006.01) | |

(52) U.S. Cl.
CPC ............ *B60C 1/0008* (2013.01); *B32B 25/08* (2013.01); *B60C 5/14* (2013.01); *C08K 3/06* (2013.01); *C08K 5/06* (2013.01); *C08K 5/17* (2013.01); *C08K 5/34* (2013.01); *C08K 5/3492* (2013.01); *C08K 5/34922* (2013.01); *C08L 21/00* (2013.01); *C08L 23/28* (2013.01); *C08L 29/04* (2013.01); *C08L 61/06* (2013.01); *C08G 69/08* (2013.01)

(58) Field of Classification Search
CPC ........... B60C 1/0008; B60C 5/14; C08K 5/06; C08K 3/06; C08K 5/34; C08K 5/3492; C08K 5/17; C08K 5/34922; C08L 23/28; C08L 61/06; C08L 21/00; C08L 29/04; B32B 25/08; C08G 69/08
See application file for complete search history.

(56) References Cited

U.S. PATENT DOCUMENTS

| | | | | |
|---|---|---|---|---|
| 6,209,603 B1 * | 4/2001 | Kanenari | ............... | B60C 9/1821 152/209.4 |
| 2010/0112257 A1 | 5/2010 | Morooka | | |
| 2013/0078477 A1 * | 3/2013 | Shibata | ................... | C08L 21/00 428/475.5 |
| 2015/0343844 A1 * | 12/2015 | Seto | ...................... | C08L 101/00 152/510 |

FOREIGN PATENT DOCUMENTS

| | | |
|---|---|---|
| EP | 2 311 633 A1 | 4/2011 |
| EP | 2 581 237 A1 | 4/2013 |
| JP | 2010-132850 A | 6/2010 |
| JP | 4858654 B1 | 11/2011 |
| JP | 2013-006387 A | 10/2012 |
| WO | WO 2010/073375 A1 | 7/2010 |

OTHER PUBLICATIONS

Anil K. Bhowmick et al., Handbook of Elastomers (Second Edition), Jan. 31, 2005, pp. 655-656, China Petrochemical Press (See Attached English Language Summary).

* cited by examiner

*Primary Examiner* — Andrew J. Oyer
(74) *Attorney, Agent, or Firm* — Polsinelli PC

(57) ABSTRACT

A laminate of a thermoplastic resin or thermoplastic elastomer composition film and a rubber composition layer, which can be used as an inner liner for a pneumatic tire, with improved adhesive strength at the interface of the thermoplastic resin or thermoplastic elastomer composition film and the rubber composition layer. A laminate comprising a thermoplastic resin or thermoplastic elastomer composition film and a rubber composition layer, the rubber composition containing a rubber component, a condensate of a phenol compound and formaldehyde, and methylene donor and a vulcanizing agent, wherein 2.5-40% by mass of the rubber component is halogenated isomonoolefin-p-alkyl styrene copolymer, the content of the condensate is 0.5-20 parts by mass per 100 parts by mass of the rubber component, and the content of the methylene donor is 0.25-200 parts by mass per 100 parts by mass of the rubber component.

20 Claims, No Drawings

LAMINATE OF THERMOPLASTIC RESIN FILM AND RUBBER, INNER LINER MATERIAL, AND PNEUMATIC TIRE

CROSS REFERENCE TO RELATED APPLICATIONS

This application is a National Phase filing under 35 U.S.C. § 371 of PCT/JP2016/070888 filed on Jul. 14, 2016; and this application claims priority to Application No. 2015-143309 filed in Japan on Jul. 17, 2015 under 35 U.S.C. § 119. The entire contents of each application are hereby incorporated by reference.

TECHNICAL FIELD

The present invention relates to a laminate of a film of a thermoplastic resin or thermoplastic elastomer composition and a layer of a rubber composition, an inner liner material for a pneumatic tire comprising the laminate, and a pneumatic tire comprising the laminate as an inner liner material.

BACKGROUND ART

A pneumatic tire comprising a laminate of a film of a thermoplastic resin or thermoplastic elastomer composition and a layer of a rubber composition, wherein the rubber composition comprises a rubber component, a condensate of a phenolic compound and formaldehyde, a methylene donor and a vulcanizing agent, and the vulcanizing agent is sulfur or an organic peroxide (Japanese Patent No. 4858654).

CITATION LIST

Patent Literature

Patent literature 1: Japanese Patent No. 4858654

SUMMARY OF INVENTION

Technical Problem

In a laminate of a film of a thermoplastic resin or thermoplastic elastomer composition film and a layer of a rubber composition which can be used as an inner liner material of a pneumatic tire, an object of the present invention is to further improve the adhesive strength at the interface between the film of the thermoplastic resin or thermoplastic elastomer composition and the layer of the rubber composition.

Solution to Problem

The inventor of the present invention found that, by using a halogenated isomonoolefin-p-alkyl styrene copolymer as a part of a rubber component constituting a rubber composition in a laminate of a film of a thermoplastic resin or thermoplastic elastomer composition and a layer of a rubber composition, and blending a condensate of a phenolic compound and formaldehyde and a methylene donor in the rubber composition, the adhesive strength at the interface between the film of the thermoplastic resin or thermoplastic elastomer composition and the layer of the rubber composition is effectively improved, thereby completing the present invention.

The present invention is a laminate for a pneumatic tire, comprising a film of a thermoplastic resin or thermoplastic elastomer composition and a layer of a rubber composition, wherein the rubber composition comprises a rubber component, a condensate of a compound represented by formula (1):

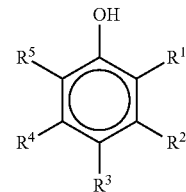

(1)

wherein $R^1$, $R^2$, $R^3$, $R^4$, and $R^5$ are each independently hydrogen, a hydroxyl group, an alkyl group having 1 to 8 carbon atoms, or an alkoxy group having 1 to 8 carbon atoms,
and formaldehyde, a methylene donor, and a vulcanizing agent, wherein the rubber component comprises from 2.5 to 40% by weight a halogenated isomonoolefin-p-alkyl styrene copolymer based on the rubber component, and the rubber composition comprises from 0.5 to 20 parts by weight of the condensate and from 0.25 to 200 parts by weight of the methylene donor based on 100 parts by weight of the rubber component.

The present invention includes the following aspects.

[1] A laminate for a pneumatic tire, comprising a film of a thermoplastic resin or thermoplastic elastomer composition and a layer of a rubber composition, wherein the rubber composition comprises a rubber component, a condensate of a compound represented by formula (1):

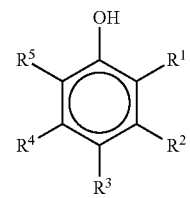

(1)

wherein $R^1$, $R^2$, $R^3$, $R^4$, and $R^5$ are each independently hydrogen, a hydroxyl group, an alkyl group having 1 to 8 carbon atoms, or an alkoxy group having 1 to 8 carbon atoms,
and formaldehyde, a methylene donor, and a vulcanizing agent, wherein the rubber component comprises from 2.5 to 40% by weight of a halogenated isomonoolefin-p-alkyl styrene copolymer based on the rubber component, and the rubber composition comprises from 0.5 to 20 parts by weight of the condensate and from 0.25 to 200 parts by weight of the methylene donor based on 100 parts by weight of the rubber component.

[2] The laminate according to [1], wherein a ratio of a content of the methylene donor to a content of the condensate is from 0.5 to 10.

[3] The laminate according to [1] or [2], wherein the thermoplastic resin is at least one selected from the group consisting of polyvinyl alcohol, ethylene-vinyl alcohol copolymer, nylon 6, nylon 66, nylon 11, nylon 12, nylon 610, nylon 612, nylon 6/66, nylon MXD6, and nylon 6T.

[4] The laminate according to any one of [1] to [3], wherein the thermoplastic elastomer composition is a composition comprising a thermoplastic resin component and an elastomer component dispersed in the thermoplastic resin component; the thermoplastic resin component is at least one selected from the group consisting of polyvinyl alcohol, ethylene-vinyl alcohol copolymer, nylon 6, nylon 66, nylon 11, nylon 12, nylon 610, nylon 612, nylon 6/66, nylon MXD6, and nylon 6T; and the elastomer component is at least one selected from the group consisting of a halogenated isomonoolefin-p-alkyl styrene copolymer, a maleic anhydride-modified ethylene-α-olefin copolymer, an ethylene-glycidyl methacrylate copolymer, and a maleic anhydride-modified ethylene-ethyl acrylate copolymer.

[5] The laminate according to any one of [1] to [4], wherein the methylene donor is at least one selected from the group consisting of modified etherified methylol melamine, paraformaldehyde, hexamethylenetetramine, pentamethylenetetramine, and hexamethoxymethylmelamine.

[6] An inner liner material for a pneumatic tire, comprising the laminate according to any one of [1] to [5].

[7] A pneumatic tire comprising the laminate according to any one of [1] to [5] as an inner liner material.

Advantageous Effects of Invention

The laminate of a film of a thermoplastic resin or a thermoplastic elastomer composition and a layer of a rubber composition of the present invention is excellent in the adhesive strength at the interface between the film of the thermoplastic resin or the thermoplastic elastomer composition and the layer of the rubber composition.

DESCRIPTION OF EMBODIMENTS

The present invention is a laminate for a pneumatic tire, comprising a film of a thermoplastic resin or thermoplastic elastomer composition and a layer of a rubber composition, wherein the rubber composition comprises a rubber component, a condensate of a compound represented by formula (1):

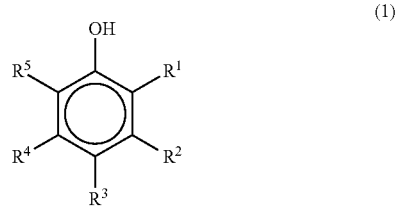

wherein $R^1$, $R^2$, $R^3$, $R^4$, and $R^5$ are each independently hydrogen, a hydroxyl group, an alkyl group having 1 to 8 carbon atoms, or an alkoxy group having 1 to 8 carbon atoms,
and formaldehyde, a methylene donor, and a vulcanizing agent, wherein the rubber component comprises from 2.5 to 40% by weight of a halogenated isomonoolefin-p-alkyl styrene copolymer based on the rubber component, and the rubber composition comprises from 0.5 to 20 parts by weight of the condensate and from 0.25 to 200 parts by weight of the methylene donor based on 100 parts by weight of the rubber component.

Examples of the thermoplastic resin constituting the film include a polyamide resin, a polyester resin, a polynitrile resin, a polymethacrylate resin, a polyvinyl resin, a cellulose resin, a fluorine resin, an imide resin, a polystyrene resin, and a polyolefin resin.

Examples of the polyamide resin include nylon 6 (N6), nylon 66 (N66), nylon 46 (N46), nylon 11 (N11), nylon 12 (N12), nylon 610 (N610), nylon 612 (N612), nylon 6/66 (N6/66), nylon 6/66/12 (N6/66/12), nylon 6/66/610 (N6/66/610), nylon MXD6 (MXD6), nylon 6T, nylon 6/6T, nylon 9T, nylon 66/PP copolymer, and nylon 66/PPS copolymer.

Examples of the polyester resin include aromatic polyesters such as polyethylene terephthalate (PET), polybutylene terephthalate (PBT), polyethylene isophthalate (PEI), PET/PEI copolymer, polyarylate (PAR), polybutylene naphthalate (PBN), liquid crystal polyester, and polyoxyalkylene diimide acid/polybutyrate terephthalate copolymer.

Examples of the polynitrile resin include polyacrylonitrile (PAN), polymethacrylonitrile, acrylonitrile/styrene copolymer (AS), methacrylonitrile/styrene copolymer, methacrylonitrile/styrene/butadiene copolymer.

Examples of the polymethacrylate resin include polymethyl methacrylate (PMMA) and polymethyl methacrylate.

Examples of the polyvinyl type resin include polyvinyl acetate (PVAc), polyvinyl alcohol (PVA), ethylene-vinyl alcohol copolymer (EVOH), polyvinylidene chloride (PVDC), polyvinyl chloride (PVC), vinyl chloride/vinylidene chloride copolymer, and vinylidene chloride/methyl acrylate copolymer.

Examples of the cellulose resin include cellulose acetate and cellulose acetate butyrate.

Examples of the fluorine-based resin include polyvinylidene fluoride (PVDF), polyvinyl fluoride (PVF), polychlorofluoroethylene (PCTFE), and tetrafluoroethylene/ethylene copolymer (ETFE).

Examples of the imide resin include aromatic polyimide (PI). Examples of the polystyrene resin include polystyrene (PS).

Examples of the polyolefin resin include polyethylene (PE) and polypropylene (PP).

Among these, polyvinyl alcohol, ethylene-vinyl alcohol copolymer, nylon 6, nylon 66, nylon 11, nylon 12, nylon 610, nylon 612, nylon 6/66, nylon MXD 6, and nylon 6T are preferable in terms of compatibility between fatigue resistance and air blocking property.

For improving processability, dispersibility, heat resistance, antioxidant properties, or the like, the thermoplastic resin may be blended with a blending agent generally blended in the resin composition, such as a filler, a reinforcing agent, a processing aid, a stabilizer, or an antioxidant, to the extent that an effect of the present invention is not impaired. From the viewpoint of air blocking property and heat resistance, a plasticizer is preferably not blended, but may be blended as long as the plasticizer does not impair an effect of the present invention.

A thermoplastic elastomer composition constituting a film is a composition comprising a thermoplastic resin component and an elastomer component dispersed in the thermoplastic resin component, wherein the thermoplastic resin component constitutes a matrix phase and the elastomer component constitutes a dispersed phase.

As the thermoplastic resin component constituting the thermoplastic elastomer composition, the same thermoplastic resin as described above can be used.

Examples of the elastomer component constituting the thermoplastic elastomer composition include diene rubber and hydrogenated product thereof, olefinic rubber, halogen-containing rubber, silicone rubber, sulfur-containing rubber, and fluororubber.

Examples of the diene rubber and hydrogenated product thereof include natural rubber (NR), isoprene rubber (IR), epoxidized natural rubber, styrene butadiene rubber (SBR), butadiene rubber (BR) (high cis BR and low cis BR), acrylonitrile butadiene rubber (NBR), hydrogenated NBR, and hydrogenated SBR.

Examples of the olefin rubber include ethylene propylene rubber (EPM), ethylene propylene diene rubber (EPDM), maleic acid-modified ethylene propylene rubber (M-EPM), maleic anhydride-modified ethylene-α-olefin copolymer, ethylene-glycidyl methacrylate copolymer, maleic anhydride-modified ethylene-ethyl acrylate copolymer (modified EEA), butyl rubber (IIR), isobutylene and aromatic vinyl or diene monomer copolymer, acrylic rubber (ACM), and ionomer.

Examples of the halogen-containing rubber include halogenated butyl rubber such as brominated butyl rubber (Br-IIR) and chlorinated butyl rubber (Cl-IIR), a halogenated isomonoolefin-p-alkyl styrene copolymer (for example, brominated isobutylene-p-methylstyrene copolymer (BIMS)), halogenated isobutylene-isoprene copolymer rubber, chloroprene rubber (CR), hydrin rubber (CHR), chlorosulfonated polyethylene (CSM), chlorinated polyethylene (CM), and maleic acid-modified chlorinated polyethylene (M-CM).

Examples of the silicone rubber include methyl vinyl silicone rubber, dimethyl silicone rubber, and methylphenyl vinyl silicone rubber. Examples of the sulfur-containing rubber include polysulfide rubber. Examples of the fluororubber include vinylidene fluoride rubber, fluorine-containing vinyl ether rubber, tetrafluoroethylene-propylene rubber, fluorine-containing silicone rubber, and fluorine-containing phosphazene rubber.

Among these, a halogenated isomonoolefin-p-alkyl styrene copolymer, a maleic anhydride-modified ethylene-α-olefin copolymer, an ethylene-glycidyl methacrylate copolymer, and a maleic anhydride-modified ethylene-ethyl acrylate copolymer are preferable from the viewpoint of air blocking property.

In the elastomer component, a blending agent generally blended in a rubber composition such as another reinforcing agent (filler) such as carbon black or silica, a softener, an antioxidant, and a processing aid may be blended to the extent that an effect of the present invention is not impaired.

Examples of a combination of an elastomer component with a thermoplastic resin component constituting the thermoplastic elastomer composition include, but are not limited to, a combination of halogenated butyl rubber with a polyamide resin, a combination of a brominated isobutylene-p-methylstyrene copolymer rubber with a polyamide resin, a combination of butadiene rubber with a polystyrene resin, a combination of isoprene rubber with a polystyrene resin, a combination of a hydrogenated butadiene rubber with a polystyrene resin, a combination of an ethylene propylene rubber with a polyolefin resin, a combination of an ethylene propylene diene rubber with a polyolefin resin, a combination of a noncrystalline butadiene rubber with a syndiotactic poly(1,2-polybutadiene), a combination of an amorphous isoprene rubber with trans-poly(1,4-isoprene), and a combination of a fluororubber with a fluororesin. A combination of a butyl rubber with a polyamide resin is preferable, since it has excellent air blocking properties. A combination of a brominated isobutylene-p-methylstyrene copolymer rubber which is a modified butyl rubber with nylon 6/66, nylon 6, or a blended resin of nylon 6/66 and nylon 6 is particularly preferable in view of compatibility between fatigue resistance and air blocking property.

A thermoplastic elastomer composition can be produced by melt-kneading a thermoplastic resin component and an elastomer component, for example, in a twin-screw kneading extruder or the like to disperse the elastomer component as a dispersed phase in the thermoplastic resin component forming a matrix phase. The weight ratio of the thermoplastic resin component to the elastomer component is preferably, but not limited to, from 10/90 to 90/10, more preferably from 15/85 to 90/10.

The thermoplastic resin or thermoplastic elastomer composition may comprise various additives as long as the effects of the present invention are not impaired.

The rubber composition constituting the layer of the rubber composition comprises a rubber component, a condensate of a compound represented by formula (1) and formaldehyde, a methylene donor and a vulcanizing agent.

The rubber composition comprises a rubber component, and the rubber component comprises from 2.5 to 40% by weight of a halogenated isomonoolefin-p-alkylstyrene copolymer.

The halogenated isomonoolefin-p-alkylstyrene copolymer can be produced by halogenating a copolymer of isomonoolefin and p-alkylstyrene. The mixing ratio, polymerization rate, average molecular weight, polymerization form (block copolymer, random copolymer, etc.), viscosity, halogen atom and the like of the halogenated isomonoolefin and p-alkylstyrene are not particularly limited, and may be arbitrarily selected according to the physical properties or the like required for the thermoplastic elastomer composition. Examples of the isomonoolefin constituting the halogenated isomonoolefin-p-alkylstyrene copolymer include isobutylene, isopentene, and isohexene, and isobutylene is preferable. Examples of the p-alkylstyrene constituting the halogenated isomonoolefin-p-alkylstyrene copolymer include p-methylstyrene, p-ethylstyrene, p-propylstyrene and p-butylstyrene, and p-methylstyrene is preferable. Examples of the halogen constituting the halogenated isomonoolefin-p-alkylstyrene copolymer include fluorine, chlorine, bromine and iodine, and bromine is preferable. A particularly preferable halogenated isomonoolefin-p-alkylstyrene copolymer is a brominated isobutylene-p-methylstyrene copolymer.

The brominated isobutylene-p-methylstyrene copolymer is a brominated product of an isobutylene-p-methylstyrene copolymer having a repeating unit represented by formula (4).

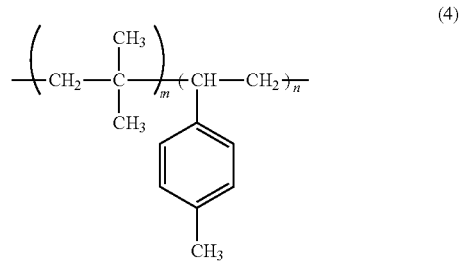

(4)

Typically, it has a repeating unit represented by formula (5).

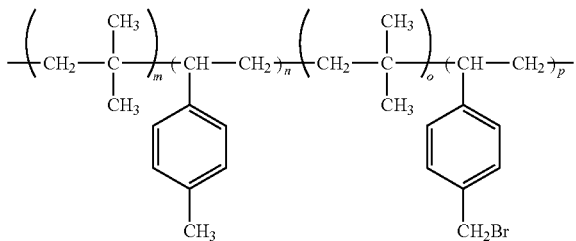

(5)

The brominated isobutylene-p-methylstyrene copolymer is available under the trade name EXXPRO® from Exxon-Mobil Chemical Company.

The rubber component comprises from 2.5 to 40% by weight of a halogenated isomonoolefin-p-alkylstyrene copolymer based on the rubber component constituting the rubber composition. The rubber component comprises preferably from 2.5 to 20% by weight, more preferably from 2.5 to 10% by weight of a halogenated isomonoolefin-p-alkylstyrene copolymer. When the content of the halogenated isomonoolefin-p-alkylstyrene copolymer is too small, an effect of improving the adhesiveness may not be obtained. When the content of the halogenated isomonoolefin-p-alkylstyrene copolymer is too large, a reaction with a resin easily occurs during mixing or molding, and the processability is reduced.

The present invention has a remarkable synergistic effect that, by combining a halogenated isomonoolefin-p-alkyl styrene copolymer with a condensate of a compound represented by formula (1) and formaldehyde and a methylene donor, the adhesive strength at the interface between the film of the thermoplastic resin or thermoplastic elastomer composition and the layer of the rubber composition can be effectively improved with a relatively small amount of a halogenated isomonoolefin-p-alkyl styrene copolymer.

Of the rubber components constituting the rubber composition, examples of a rubber component other than a halogenated isomonoolefin-p-alkyl styrene copolymer include, but are not limited to, diene rubber and a hydrogenated product thereof, olefinic rubber, halogen-containing rubber, silicone rubber, sulfur-containing rubber, and fluoro rubber.

Examples of the diene rubber and hydrogenated product thereof include natural rubber (NR), isoprene rubber (IR), epoxidized natural rubber, styrene butadiene rubber (SBR), butadiene rubber (BR) (high cis BR and low cis BR), acrylonitrile butadiene rubber (NBR), hydrogenated NBR, and hydrogenated SBR.

Examples of the olefin rubber include ethylene propylene rubber (EPM), ethylene propylene diene rubber (EPDM), maleic acid-modified ethylene propylene rubber (M-EPM), maleic anhydride modified ethylene-α-olefin copolymer, ethylene-glycidyl methacrylate copolymer, maleic anhydride modified ethylene-ethyl acrylate copolymer (modified EEA), butyl rubber (IIR), isobutylene and aromatic vinyl or diene monomer copolymer, acrylic rubber (ACM), and ionomer.

Examples of the halogen-containing rubber include halogenated butyl rubber such as brominated butyl rubber (Br-IIR) or chlorinated butyl rubber (Cl-IIR), halogenated isobutylene-isoprene copolymer rubber, chloroprene rubber (CR), hydrin rubber (CHR), chlorosulfonated polyethylene (CSM), chlorinated polyethylene (CM), and maleic acid modified chlorinated polyethylene (M-CM).

Examples of the silicone rubber include methyl vinyl silicone rubber, dimethyl silicone rubber, and methylphenyl vinyl silicone rubber. Examples of the sulfur-containing rubber include polysulfide rubber.

Examples of the fluororubber include vinylidene fluoride rubber, fluorine-containing vinyl ether rubber, tetrafluoroethylene-propylene rubber, fluorine-containing silicone rubber, and fluorine-containing phosphazene rubber.

Among them, from the viewpoint of co-crosslinkability with an adjacent rubber material, diene rubber, olefin rubber, and halogen-containing rubber are preferable; natural rubber, styrene butadiene rubber, butadiene rubber, isoprene rubber, butyl rubber, halogenated butyl rubber, and a mixture thereof are more preferable; and a combination of natural rubber with styrene butadiene rubber, a combination of natural rubber with butadiene rubber, a combination of natural rubber with butyl rubber, and a combination of natural rubber with halogenated butyl rubber are still more preferable.

The rubber composition comprises a condensate of a compound represented by formula (1) and formaldehyde.

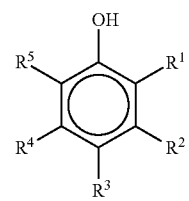

(1)

In formula (1), $R^1$, $R^2$, $R^3$, $R^4$, and $R^5$ each independently represent hydrogen, a hydroxyl group, an alkyl group having 1 to 8 carbon atoms, or an alkoxy group having 1 to 8 carbon atoms.

One preferable example of the compound represented by formula (1) is one in which at least one of $R^1$, $R^2$, $R^3$, $R^4$, and $R^5$ is an alkyl group having 1 to 8 carbon atoms and the rest is hydrogen or an alkyl group having 1 to 8 carbon atoms. A preferable specific example of the compound represented by formula (1) is cresol.

Another preferable example of the compound represented by formula (1) is one in which at least one of $R^1$, $R^2$, $R^3$, $R^4$, and $R^5$ is a hydroxyl group and the rest is hydrogen or an alkyl group having 1 to 8 carbon atoms. Another preferable specific example of the compound represented by formula (1) is resorcinol (also referred to as "resorcin").

Examples of the condensate of the compound represented by formula (1) and formaldehyde include cresol/formaldehyde condensate and resorcin/formaldehyde condensate. These condensates may be modified so long as an effect of the present invention is not impaired. For example, a modified resorcin/formaldehyde condensate which is a resorcin/formaldehyde condensate modified with an epoxy compound can also be used in the present invention. These condensates are commercially available and such commercially available products can be used in the present invention.

The condensate of the compound represented by formula (1) and formaldehyde is preferably a compound represented by formula (2) or formula (3).

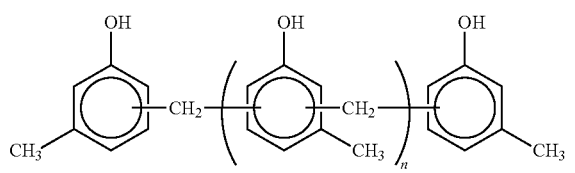

(2)

In formula (2), n is an integer of 1 to 20, preferably an integer of 1 to 10, and more preferably an integer of 1 to 5.

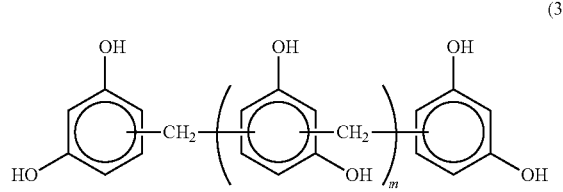

(3)

In formula (3), m is an integer of 1 to 20, preferably an integer of 1 to 10, and more preferably an integer of 1 to 3.

The content of the condensate of the compound represented by formula (1) and formaldehyde (hereinafter sometimes simply referred to as "condensate") is from 0.5 to 20 parts by weight, preferably from 1 to 10 parts by weight based on 100 parts by weight of the rubber component. When the content of the condensate is too small, the amount of heat and time necessary for obtaining good adhesion are increased, and therefore, the vulcanization efficiency deteriorates. When the content of the condensate is too large, the vulcanized elongation of the obtained rubber composition is impaired and breakage tends to occur.

The rubber composition comprises a methylene donor.

A methylene donor refers to a basic compound that generates formaldehyde by heating and the like, and examples thereof include hexamethylene tetramine, pentamethylene tetramine, hexamethylene diamine, methylol melamine, etherified methylol melamine, modified etherified methylol melamine, esterified methylol melamine, hexamethoxymethylol melamine, hexamethylol melamine, hexakis(ethoxymethyl)melamine, hexakis (methoxymethyl)melamine, N,N',N''-trimethyl-N,N',N''-trimethylolmelamine, N,N',N''-trimethylolmelamine, N-methylolmelamine, N,N'-bis(methoxymethyl)melamine, N,N',N''-tributyl-N,N',N''-trimethylolmelamine, and paraformaldehyde. Among them, modified etherified methylol melamine is preferable from the viewpoint of the release temperature of formaldehyde.

The content of the methylene donor is from 0.25 to 200 parts by weight, preferably from 0.5 to 80 parts by weight, more preferably from 1 to 40 parts by weight based on 100 parts by weight of the rubber component. When the content of the methylene donor is too small, the methylene donor is consumed in the resin reaction in the rubber composition system, and therefore, the reaction in the interfacial reaction does not proceed and the adhesion is deteriorated. When the content is too much, the reaction in the rubber composition system is promoted too much, or the crosslinking reaction in the resin system to be adhered is induced and the adhesion is deteriorated.

The ratio of the content of the methylene donor to the content of the condensate is preferably from 0.5 to 10, more preferably from 1 to 4, and still more preferably from 1 to 3. When the ratio is too small, the donor is consumed in the resin reaction in the rubber composition system, and therefore, the reaction in the interfacial reaction does not proceed and the adhesion is deteriorated. When the ratio is too large, the reaction in the rubber composition system is promoted too much, or the crosslinking reaction in the resin system to be adhered is induced, and the adhesion is deteriorated.

The rubber composition comprises a vulcanizing agent.

Examples of the vulcanizing agent include an inorganic vulcanizing agent and an organic vulcanizing agent. Examples of the inorganic vulcanizing agent include sulfur, sulfur monochloride, selenium, tellurium, zinc oxide, magnesium oxide, and lead monoxide. Examples of the organic vulcanizing agent include a sulfur-containing organic compound, a dithiocarbamate, an oxime, tetrachloro-p-benzoquinone, a dinitroso compound, a modified phenolic resin, a polyamine, and an organic peroxide. Among them, sulfur, an organic peroxide such as 1,3-bis(t-butylperoxyisopropyl)benzene, a modified phenolic resin such as a brominated alkylphenol/formaldehyde condensate, zinc oxide, and a sulfur-containing organic compound are preferable.

The content of the vulcanizing agent is preferably from 0.5 to 10 parts by weight, more preferably from 0.5 to 8 parts by weight, and still more preferably from 0.5 to 5 parts by weight, based on 100 parts by weight of the rubber component. When the content of the vulcanizing agent is too small, the strength of the rubber is reduced, and as a result, good adhesiveness is not exhibited. When the content of the vulcanizing agent is too large, the adhesion reaction between the rubber and the film is inhibited.

The rubber composition may further comprise a vulcanization accelerator.

Examples of the vulcanization accelerator include an aldehyde·ammonia-based, aldehyde·amine-based, thiourea-based, guanidine-based, thiazole-based, sulfenamide-based, thiuram-based, dithiocarbamate-based, and xanthogenate-based vulcanization accelerators. A thiazole-based, sulfenamide-based, and thiuram-based vulcanization accelerators are preferable.

The thiazole-based vulcanization accelerator is a compound having a thiazole structure, and examples thereof include di-2-benzothiazolyl disulfide, mercaptobenzothiazole, benzothiazyl disulfide, zinc salt of mercaptobenzothiazole, (dinitrophenyl)mercaptobenzothiazole, and (N,N-diethylthiocarbamoylthio)benzothiazole. Among them, di-2-benzothiazolyl disulfide is preferable.

The sulfenamide-based vulcanization accelerator is a compound having a sulfenamide structure, and examples thereof include N-cyclohexylbenzothiazole sulfenamide, N-t-butylbenzothiazole sulfenamide, N-oxydiethylene benzothiazole sulfenamide, N,N-dicyclohexyl benzothiazole sulfenamide, and (morpholinodithio)benzothiazole. Among them, N-t-butyl-2-benzothiazole sulfenamide is preferable.

The thiuram-based vulcanization accelerator is a compound having a thiuram structure, and example thereof include tetrakis(2-ethylhexyl)thiuram disulfide, tetramethyl thiuram disulfide, tetramethyl thiuram monosulfide, tetraethyl thiuram disulfide, tetrabutyl thiuram disulfide, and dipentamethylene thiuram hexasulfide. Among them, tetrakis (2-ethylhexyl) thiuram disulfide is preferable.

The content of the vulcanization accelerator is preferably from 0.5 to 10 parts by weight, more preferably from 0.5 to 8 parts by weight, and still more preferably from 0.5 to 5 parts by weight, based on 100 parts by weight of the rubber component. When the content of the vulcanization accelerator is too small, the vulcanization reaction is not completed within a desired vulcanization time, and therefore, the rubber strength decreases, and as a result, good adhesiveness is not exhibited. When the content of the vulcanization accelerator is too large, the adhesion reaction between the rubber and the film is inhibited.

The laminate of the present invention can be produced by laminating a rubber composition on a film of a thermoplastic resin or thermoplastic elastomer composition. More specifically, although not limited, a laminate can be manufactured as follows. First, a thermoplastic resin or thermoplastic elastomer composition film is formed by molding a thermoplastic resin or thermoplastic elastomer composition into a film shape by a molding apparatus such as an inflation molding apparatus or a T die extruder. Next, the rubber composition is extruded onto the film by a T-die extruder or the like and laminated at the same time to produce a laminate.

The pneumatic tire of the present invention can be produced by a conventional method. For example, the laminate of the present invention as an inner liner material is placed on the tire molding drum with the side of the film of a thermoplastic resin or thermoplastic elastomer composition facing the tire molding drum. The members used for manufacturing ordinary tires such as a carcass layer made of unvulcanized rubber, a belt layer, a tread layer, and the like are sequentially stuck thereon, and after molding, the drum is pulled out to obtain a green tire. Next, by heating and vulcanizing this green tire according to a conventional method to obtain a pneumatic tire.

EXAMPLES (1) Preparation of Rubber Composition

The following raw materials were blended at the blending ratios listed on Table 1 and Table 2 to prepare rubber compositions.

Styrene butadiene rubber: "Nipol 1502" manufactured by Zeon Corporation

Brominated isobutylene-p-methylstyrene copolymer: EXXPRO® MDX89-4 manufactured by ExxonMobil Chemical Company Natural rubber: SIR-20

Carbon black: "SEAST V" manufactured by Tokai Carbon Co., Ltd.

Stearic acid: Industrial stearic acid

Aromatic oil: "Desorex No. 3" manufactured by SHOWA SHELL SEKIYU K. K.

Zinc oxide: "Zinc Oxide No. 3" manufactured by SEIDO CHEMICAL INDUSTRY CO., LTD.

Modified resorcin/formaldehyde condensate: "Sumikanol 620" manufactured by TAOKA CHEMICAL COMPANY, LIMITED Methylene donor: modified etherified methylol melamine ("Sumikanol 507AP" manufactured by TAOKA CHEMICAL COMPANY, LIMITED)

Sulfur: 5% oil-extended treated sulfur

Vulcanization accelerator: di-2-benzothiazolyl disulfide ("NOCCELER DM" manufactured by OUCHI SHINKO CHEMICAL INDUSTRIAL CO., LTD.)

(2) Preparation of Thermoplastic Elastomer Composition Film

One hundred (100) parts by weight of brominated isobutylene-p-methylstyrene copolymer (EXXPRO® 3035 manufactured by ExxonMobil Chemical Company), 0.5 parts by weight of zinc oxide ("Zinc Oxide No. 3" manufactured by SEIDO CHEMICAL INDUSTRY CO., LTD.), 0.2 parts by weight of stearic acid (industrial stearic acid), 1 part by weight of zinc stearate ("Zinc stearate" manufactured by NOF CORPORATION), 100 parts by weight of nylon 6/66 ("UBE Nylon" 5033B manufactured by UBE INDUSTRIES, LTD.), 10 parts by weight of maleic anhydride-modified ethylene-ethyl acrylate copolymer (Rilsan® BESN 0 TL manufactured by ARKEMA K.K.), and 20 parts by weight of plasticizer (N-butylbenzenesulfonamide "BM-4" manufactured by DAIHACHI CHEMICAL INDUSTRY CO., LTD.) were mixed to prepare a thermoplastic elastomer composition, and the thermoplastic elastomer composition was molded by an inflation molding apparatus to prepare a thermoplastic elastomer composition film having a thickness of 0.1 mm. The prepared thermoplastic elastomer composition film is hereinafter, also referred to as "film A".

(3) Preparation of Thermoplastic Resin Film

UBE Nylon 5033B manufactured by UBE INDUSTRIES, LTD. was molded by an inflation molding apparatus to prepare a thermoplastic resin film having a thickness of 0.1 mm. The prepared thermoplastic resin film is hereinafter also referred to as "film B".

(4) Preparation of Laminate

Using an extruder, the rubber composition prepared in above (1) was extrusion-laminated on the film prepared in above (2) and (3) with a thickness of 0.7 mm to prepare a laminate.

(5) Evaluation of Laminate

For the prepared laminate, the peel strength was evaluated. The evaluation results of the laminate of the thermoplastic elastomer composition film and the rubber composition are listed on Table 1, and the evaluation results of the laminate of the thermoplastic resin film and the rubber composition are listed on Table 2. The evaluation method of peel strength is as follows.

Peel Strength

A sample of the laminate was cut to a width of 25 mm after vulcanization and the peel strength at the interface between the film of the strip test piece and the rubber was measured in accordance with JIS-K6256. In Table 1 and Table 2, the peel strength of each example is listed as the ratio to the peel strength of each comparative example (hereinafter, referred to as "peel strength index"). Incidentally, the peel strength of Comparative Example 1 was 160 N/25 mm, and the peel strength of Comparative Example 2 was 200 N/25 mm.

TABLE 1

| | | | Comparative Example 1 | Example 1 | Example 2 | Example 3 | Example 4 | Example 5 |
|---|---|---|---|---|---|---|---|---|
| Rubber composition | Styrene butadiene rubber | parts by weight | 50 | 47.5 | 45 | 40 | 35 | 30 |
| | Brominated isobutylene-p-methylstyrene copolymer | parts by weight | — | 5 | 10 | 20 | 30 | 40 |
| | Natural rubber | parts by weight | 50 | 47.5 | 45 | 40 | 35 | 30 |
| | Carbon black | parts by weight | 60 | 60 | 60 | 60 | 60 | 60 |
| | Stearic acid | parts by weight | 1 | 1 | 1 | 1 | 1 | 1 |
| | Aromatic oil | parts by weight | 7 | 7 | 7 | 7 | 7 | 7 |
| | Oxidation zinc | parts by weight | 3 | 3 | 3 | 3 | 3 | 3 |
| | Modified resorcin/formaldehyde condensate | parts by weight | 2 | 2 | 2 | 2 | 2 | 2 |
| | Methylene donor | parts by weight | 4 | 4 | 4 | 4 | 4 | 4 |
| | Sulfur | parts by weight | 2 | 2 | 2 | 2 | 2 | 2 |
| | Vulcanization accelerator | parts by weight | 1.5 | 1.5 | 1.5 | 1.5 | 1.5 | 1.5 |
| | Laminated film | | film A | film A | film A | film A | film A | film A |
| | Peel strength index (The peel strength of Comparative Example 1 is set to 1) | | 1 | 1.2 | 1.2 | 1.2 | 1.2 | 1.2 |

TABLE 2

| | | | Comparative Example 2 | Example 6 | Example 7 | Example 8 | Example 9 | Example 10 |
|---|---|---|---|---|---|---|---|---|
| Rubber composition | Styrene butadiene rubber | parts by weight | 50 | 47.5 | 45 | 40 | 35 | 30 |
| | Brominated isobutylene-p-methylstyrene copolymer | parts by weight | — | 5 | 10 | 20 | 30 | 40 |
| | Natural rubber | parts by weight | 50 | 47.5 | 45 | 40 | 35 | 30 |
| | Carbon black | parts by weight | 60 | 60 | 60 | 60 | 60 | 60 |
| | Stearic acid | parts by weight | 1 | 1 | 1 | 1 | 1 | 1 |
| | Aromatic oil | parts by weight | 7 | 7 | 7 | 7 | 7 | 7 |
| | Oxidation zinc | parts by weight | 3 | 3 | 3 | 3 | 3 | 3 |
| | Modified resorcin/formaldehyde condensate | parts by weight | 2 | 2 | 2 | 2 | 2 | 2 |
| | Methylene donor | parts by weight | 4 | 4 | 4 | 4 | 4 | 4 |
| | Sulfur | parts by weight | 2 | 2 | 2 | 2 | 2 | 2 |
| | Vulcanization accelerator | parts by weight | 1.5 | 1.5 | 1.5 | 1.5 | 1.5 | 1.5 |
| | Laminated film | | film B | film B | film B | film B | film B | film B |
| | Peel strength index (The peel strength of Comparative Example 2 is set to 1) | | 1 | 1.2 | 1.2 | 1.2 | 1.2 | 1.2 |

INDUSTRIAL APPLICABILITY

The laminate of the present invention can be suitably used as an inner liner material of a pneumatic tire.

The invention claimed is:

1. A laminate for a pneumatic tire, comprising a film of a thermoplastic resin or a thermoplastic elastomer composition and a layer of a rubber composition, wherein the rubber composition comprises a rubber component, a condensate of a compound represented by formula (1):

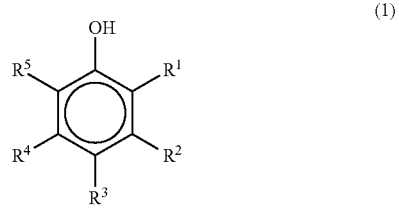

wherein $R^1$, $R^2$, $R^3$, $R^4$, and $R^5$ are each independently hydrogen, a hydroxyl group, an alkyl group having 1 to 8 carbon atoms, or an alkoxy group having 1 to 8 carbon atoms, and formaldehyde, a methylene donor, and a vulcanizing agent, wherein the rubber component comprises a styrene butadiene rubber, natural rubber and a brominated isobutylene/p-methylstyrene copolymer, and wherein the rubber component comprises from 2.5 to 40% by weight of the brominated isobutylene/p-methylstyrene copolymer based on the rubber component, and the rubber composition comprises from 0.5 to 20 parts by weight of the condensate and from 0.25 to 200 parts by weight of the methylene donor, based on 100 parts by weight of the rubber component.

2. The laminate according to claim 1, wherein a ratio of a content of the methylene donor to a content of the condensate is from 0.5 to 10.

3. The laminate according to claim 1 wherein the thermoplastic resin is at least one selected from the group consisting of polyvinyl alcohol, ethylene-vinyl alcohol copolymer, nylon 6, nylon 66, nylon 11, nylon 12, nylon 610, nylon 612, nylon 6/66, nylon MXD6, and nylon 6T.

4. The laminate according to claim 1, wherein the thermoplastic elastomer composition is a composition comprising a thermoplastic resin component and an elastomer component dispersed in the thermoplastic resin component; the thermoplastic resin component is at least one selected from the group consisting of polyvinyl alcohol, ethylene-vinyl alcohol copolymer, nylon 6, nylon 66, nylon 11, nylon 12, nylon 610, nylon 612, nylon 6/66, nylon MXD6, and nylon 6T; and the elastomer component is at least one selected from the group consisting of a halogenated isomonoolefin-p-alkyl styrene copolymer, a maleic anhydride-modified ethylene-a-olefin copolymer, an ethylene-glycidyl methacrylate copolymer, and a maleic anhydride-modified ethylene-ethyl acrylate copolymer.

5. The laminate according to claim 1, wherein the methylene donor is at least one selected from the group consisting of modified etherified methylol melamine, paraformaldehyde, hexamethylenetetramine, pentamethylenetetramine, and hexamethoxymethylmelamine.

6. An inner liner material for a pneumatic tire, comprising the laminate according to claim 1.

7. A pneumatic tire comprising the laminate according to claim 1 as an inner liner material.

8. The laminate according to claim 2, wherein the thermoplastic resin is at least one selected from the group consisting of polyvinyl alcohol, ethylene-vinyl alcohol copolymer, nylon 6, nylon 66, nylon 11, nylon 12, nylon 610, nylon 612, nylon 6/66, nylon MXD6, and nylon 6T.

9. The laminate according to claim 2, wherein the thermoplastic elastomer composition is a composition comprising a thermoplastic resin component and an elastomer component dispersed in the thermoplastic resin component; the thermoplastic resin component is at least one selected from the group consisting of polyvinyl alcohol, ethylene-vinyl alcohol copolymer, nylon 6, nylon 66, nylon 11, nylon 12, nylon 610, nylon 612, nylon 6/66, nylon MXD6, and nylon 6T; and the elastomer component is at least one selected from the group consisting of a brominated isobutylene-p-methylstyrene copolymer, a maleic anhydride-modified ethylene-α-olefin copolymer, an ethylene-glycidyl methacrylate copolymer, and a maleic anhydride-modified ethylene-ethyl acrylate copolymer.

10. The laminate according to claim 3, wherein the thermoplastic elastomer composition is a composition comprising a thermoplastic resin component and an elastomer component dispersed in the thermoplastic resin component; the thermoplastic resin component is at least one selected from the group consisting of polyvinyl alcohol, ethylene-vinyl alcohol copolymer, nylon 6, nylon 66, nylon 11, nylon 12, nylon 610, nylon 612, nylon 6/66, nylon MXD6, and nylon 6T; and the elastomer component is at least one selected from the group consisting of a brominated isobutylene-p-methylstyrene copolymer, a maleic anhydride-modified ethylene-α-olefin copolymer, an ethylene-glycidyl methacrylate copolymer, and a maleic anhydride-modified ethylene-ethyl acrylate copolymer.

11. The laminate according to claim 2, wherein the methylene donor is at least one selected from the group consisting of modified etherified methylol melamine, paraformaldehyde, hexamethylenetetramine, pentamethylenetetramine, and hexamethoxymethylmelamine.

12. The laminate according to claim 3, wherein the methylene donor is at least one selected from the group consisting of modified etherified methylol melamine, paraformaldehyde, hexamethylenetetramine, pentamethylenetetramine, and hexamethoxymethylmelamine.

13. The laminate according to claim 4, wherein the methylene donor is at least one selected from the group consisting of modified etherified methylol melamine, paraformaldehyde, hexamethylenetetramine, pentamethylenetetramine, and hexamethoxymethylmelamine.

14. An inner liner material for a pneumatic tire, comprising the laminate according to claim 2.

15. An inner liner material for a pneumatic tire, comprising the laminate according to claim 3.

16. An inner liner material for a pneumatic tire, comprising the laminate according to claim 4.

17. An inner liner material for a pneumatic tire, comprising the laminate according to claim 5.

18. A pneumatic tire comprising the laminate according to claim 2 as an inner liner material.

19. A pneumatic tire comprising the laminate according to claim 3 as an inner liner material.

20. A pneumatic tire comprising the laminate according to claim 4 as an inner liner material.

* * * * *